Patented Apr. 3, 1951

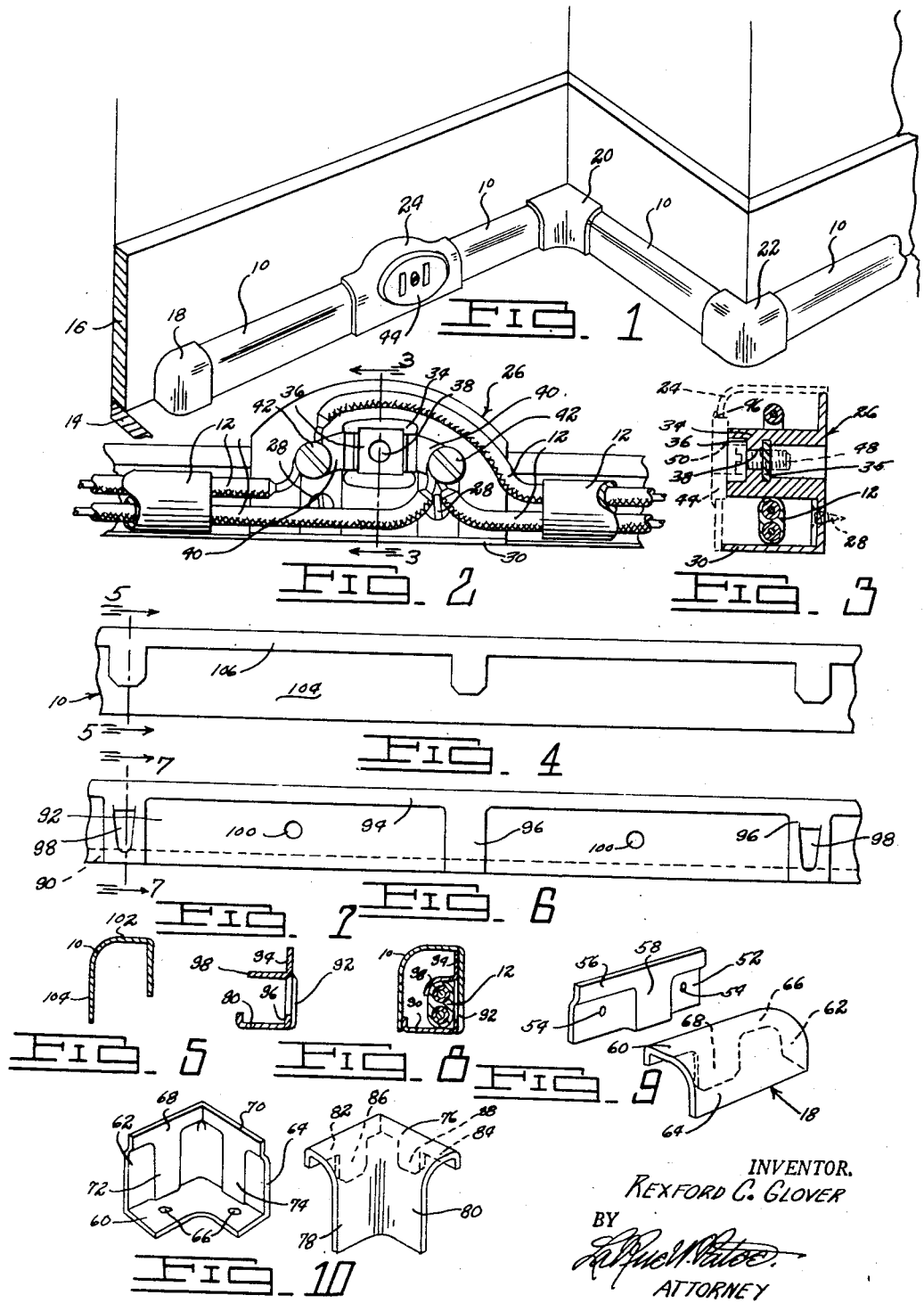

2,547,385

UNITED STATES PATENT OFFICE 2,547,385

CONDUIT FOR ELECTRICAL CONNECTIONS AND OUTLET TERMINALS

Rexford C. Glover, Clio, Mich.

Application April 4, 1947, Serial No. 739,410

2 Claims. (Cl. 174—70)

This invention relates to moldings, and more particularly to decorative conduits which may be used for wiring and outlet terminals exterior of wall surfaces.

A primary object of the invention is to provide a few fully fabricated parts that may be readily connected together enabling the applicator to apply the fabricated parts to an irregular surface particularly adaptable to electrical outlets around a room or building.

Another object of the present invention is to provide means to circumvent inside and outside angles in the wall line, and means to terminate the conduit and provide outlets at any desired point.

A further object of the invention is to provide a molding such as a conduit for receiving outlets, terminating members and corner members of a decorative material so that they may replace the usual molding of the wall baseboard and floor joint.

Other objects and advantages of the invention will more fully appear from the following description taken in connection with the accompanying drawings, in which—

Fig. 1 illustrates a perspective view of the invention annexed to a floor and wall joint;

Fig. 2 illustrates a front elevational view of the outlet with the face cover removed;

Fig. 3 illustrates a view taken on line 3—3 of Fig. 2 and showing the face cover in dotted lines;

Fig. 4 illustrates a back elevational view of the conduit cover;

Fig. 5 illustrates a view taken on line 5—5 of Fig. 4;

Fig. 6 illustrates a back elevational view of the conduit back plate;

Fig. 7 illustrates a view taken on line 7—7 of Fig. 6;

Fig. 8 illustrates a sectional view of the conduit cover in place;

Fig. 9 illustrates a perspective view of the end back plate and the end cover; and Fig. 10 illustrates a perspective view of the inner corner back plate and the inner corner cover.

Referring to the drawings, the molding 10 as herein illustrated encloses and carries electrical wiring 12 as shown in Fig. 2 and generally substitutes the molding normally positioned at the angle formed by the junction of the floor 14 with a wall 16. The end cover 18, the corner covers 20 and 22, and the outlet face cover 24 enclose and carry the electrical wiring 12 between the sections of the molding 10 and such complete assembly may be substituted for the aforementioned molding.

The outlet 26 comprises a base portion 30 which normally rests on the floor 14 and a back wall portion 32 which is normally secured to the wall 16 by means of screws 28. In some installations it might be desirable to extend the screws 38 through the base portion 30. Projecting outwardly from the back portion 32 of the outlet 26 is an apertured block 34. A substantially square aperture 36 is in the face of the block 34 but does not go clear through the block 34. From the bottom of the aperture 36 and extending on through the block 34 is an aperture 38, and a cast in threaded member 35 such as a nut. On each side of the aperture 36 the block 34 is recessed to receive substantially U shaped contact points 40 which are secured to the block 34 by screws 42. The screws 42 are secured to cast in threaded members as at 35 behind the aperture 36. The contact points 40 are adapted to receive the prongs of a standard electrical plug. The screws 42 serve a secondary function by securing the electrical wires 12 to the contact points 40 in a parallel circuit. The outlet face cover comprises an apertured cover 24 which encloses the two open sides of the outlet and a face plug 44. The face plug 44 is inserted in the aperture of the cover 24 and has a shoulder 46 which overlaps a portion of the outer surface of the cover 24, so that a screw 48 inserted in an aperture 50 in the face plug 44 and threaded into the threaded aperture 38 of the block 34 will secure the face plug 44 and the cover 24 in a position to enclose the outlet. The face plug 44 has apertures oppositely disposed the recesses of the contact points 40 so as to permit the prongs of a standard electrical plug to pass through the face plug 44 and contact the contact points 40.

The end back plate comprises a one-piece plate 52 as shown in Fig. 9, which is secured to the wall 16 by means of screws through apertures 54. The upper portion 56 of the back plate is offset so that a space is left between the wall 16 and the upper portion 56. Substantially in the center of the plate 52 and on the back surface is a vertical channel 58. The end cover 18 is a one-piece member having 3 sides, a top 60, an end 62, and a front side 64. A back portion is also provided comprising a turned down edge 66, which engages the upper portion 56 of the back plate, and a downwardly projecting tab 68 which engages the channel 58, thus enclosing the conduit on five sides.

An inside corner back plate, as illustrated in Fig. 10, is a one-piece member, having a base 60, and two vertical sides 62 and 64 at right angles to each other. The base is provided with apertures 66 through which screws may secure the back plate to the floor 14. The upper portions 68 and 70 of the sides 62 and 64 are offset, so that spaces occur between the wall 16 and the sides 62 and 64. Substantially in the centers of the back sides of the vertical members 62 and 64 are depressed channels 72 and 74. The corner cover 20 is a one-piece member having a top 76, and vertical sides 78 and 80 set at right angles to each other. Back portions are also provided comprising turned down edges 82 and 84 which engage the upper portions 68 and 70 of the back plate, and downwardly extending tabs 86 and 88 which engage the channels 72 and 74.

The conduit back plate, as illustrated in Figs. 6 and 7 is a one-piece member having a base portion 90 and a back portion 92. The back portion 92 is provided with its upper portion 94 offset so that a space occurs between the wall 16 and the upper portion 94. In the back side of the back portion 92 a plurality of channels 96 are provided and from these channels 96 tabs 98 are struck outwardly. Apertures 100 are provided in the back portion 92 of the back plate which receive screws that secure the back plate to the wall 16. If desired, the apertures may be formed in the base portion 90 and secured to the floor 14. The conduit cover 10, as illustrated in Figs. 4 and 5, is a one-piece member having a top 102 and a front side 104. Back portions are also provided comprising a turned down edge 106 which engages the upper portion 94 of the back portion 92 of the conduit back plate, and downwardly extending tabs 108 which engage the channels 96 of the back plate.

In the assembly of this device, the applicator mounts the outlets 26 around the room or building, wherever he so desires. The corner back plates and end back plates are mounted wherever necessary, one end plate being positioned adjacent an aperture in the floor 14 provided as an entrance for the wire 12. The conduit base plate is cut to the desired length and secured to the wall 16 between the outlets, corner back plates, and end back plates. The wire 12 is introduced through the aperture provided in the floor and laid along the conduit back plates and secured therein by bending down the tabs 98. After all electrical connections have been made, the various covers are snapped into place and the outlet face cover is secured.

It will be understood that a molding has been provided, serving as the usual decorative molding, as well as a conduit for electrical cables. The molding is readily attached to the wall or floor by securing a back plate in location and press fitting a front plate to the back plate which is frictionally held in place by the tabs 108 between the depressions 96 and the outer surface of the wall 16.

The device has been illustrated in a preferred form of the invention, but it will be understood that various changes including the size, shape, and arrangement of parts may be made without departing from the spirit of my invention, and it is not my intention to limit its scope other than by the terms of the appended claims.

I claim:

1. An electrical outlet comprising a back plate, means for attaching electrical wires thereon, means for receiving the prongs of a standard electrical plug on said back plate, an apertured face cover, a face plug provided to be inserted in said apertured face cover and having a shoulder around its outer edge that engages the outer surface of said face cover, means for securing said face plug to said back plate.

2. An electrical outlet comprising spaced longitudinally extending back plates adapted to be secured to a support, an outlet back plate between said plates adapted to be secured to the support, deformable tabs carried by said spaced back plates for positioning electrical wiring thereto, terminal connections for the wiring carried by said outlet back plate, spaced longitudinally extending front cover plates cooperating with said back plates to form a tube for the wiring, an apertured cover plate for said outlet back plate overlapping the adjacent ends of said front cover plates, an apertured face plug adapted to be inserted in said apertured cover plate and having a shoulder for engagement with the outer surface of said apertured cover plate, and means for securing said face plug to said outlet back plate.

REXFORD C. GLOVER.

REFERENCES CITED

The following references are of record in the file of this patent:

UNITED STATES PATENTS

| Number | Name | Date |
| --- | --- | --- |
| 1,137,634 | Kelting | Apr. 27, 1915 |
| 1,857,378 | Hubbell | May 10, 1932 |
| 1,926,001 | Goodridge | Sept. 5, 1933 |
| 2,072,703 | Beersman | Mar. 2, 1937 |
| 2,132,400 | Curren | Oct. 11, 1938 |
| 2,384,487 | O'Brien | Sept. 11, 1945 |